United States Patent [19]

Monsigny

[11] Patent Number: 4,691,938
[45] Date of Patent: Sep. 8, 1987

[54] GUIDING RAIL OF USE IN PARTICULAR IN A PASSIVE SAFETY BELT DEVICE FOR A MOTOR VEHICLE

[75] Inventor: Jean Monsigny, Saverne, France

[73] Assignee: Aciers et Outillage Peugeot, Audincourt, France

[21] Appl. No.: 829,887

[22] Filed: Feb. 18, 1986

[30] Foreign Application Priority Data

Feb. 15, 1985 [FR] France ................... 85-02235

[51] Int. Cl.⁴ .......................................... B60R 22/06
[52] U.S. Cl. ................................. 280/804; 297/473; 384/42
[58] Field of Search .................. 280/804, 802, 803; 180/268; 297/469, 473, 482, 483; 384/26, 42; 238/175–177

[56] References Cited

U.S. PATENT DOCUMENTS

| | | | |
|---|---|---|---|
| 3,805,552 | 4/1974 | Heald | 384/42 |
| 4,296,944 | 10/1981 | Matsuoka | 280/804 |
| 4,317,583 | 3/1982 | Pilhall | 280/804 |
| 4,324,419 | 4/1982 | Veda | 280/804 |
| 4,354,696 | 10/1982 | Volk | 280/804 |
| 4,394,036 | 7/1983 | Hildebrandt | 280/804 |
| 4,465,303 | 8/1984 | Miki | 280/804 |
| 4,560,187 | 12/1985 | Yoshitsugu | 280/804 |
| 4,580,813 | 4/1986 | Hashimoto | 280/804 |

*Primary Examiner*—David M. Mitchell
*Assistant Examiner*—Everett G. Diedericks, Jr.
*Attorney, Agent, or Firm*—Sughrue, Mion, Zinn, Macpeak & Seas

[57] ABSTRACT

This guiding rail (5) comprises at least in its part for guiding a slidable element comprising a bolt cooperating with a safety belt buckle, two lateral guiding portions (5b, 5c) for the displacement of the slidable element. These two portions are disposed on each side of a slot (5d) through which the bolt projects. This rail is also formed by a bearing portion (5a) for the slidable element disposed in facing relation to said slot. These lateral portions (5b, 5c) and this bearing portion (5a) are in the shape of semi-circular lobes.

6 Claims, 6 Drawing Figures

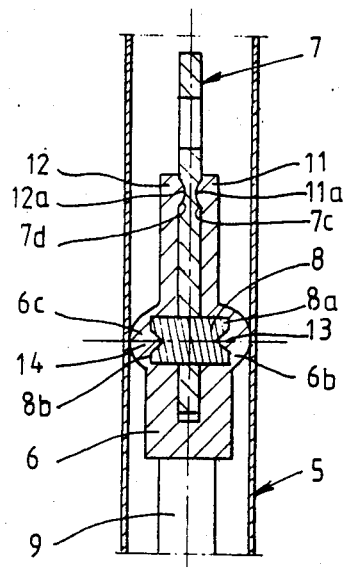
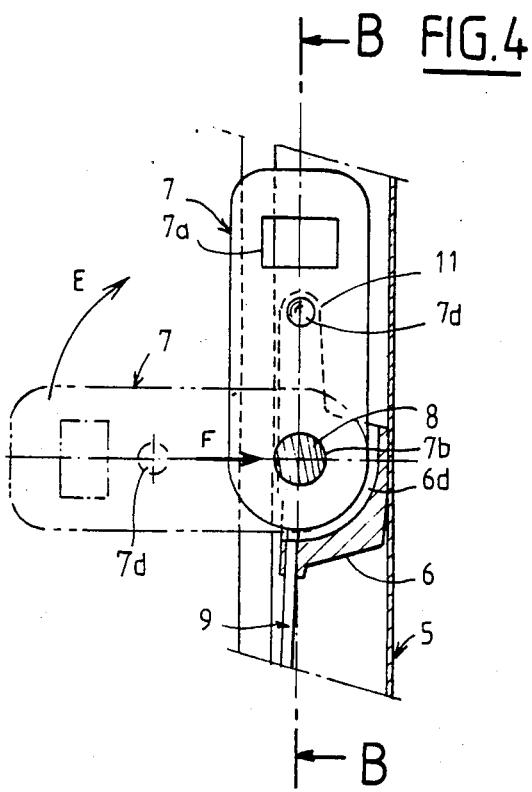
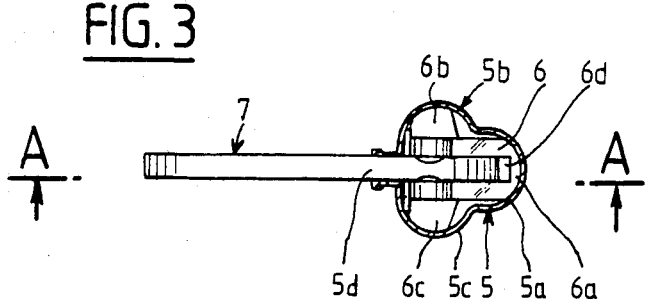

GUIDING RAIL OF USE IN PARTICULAR IN A PASSIVE SAFETY BELT DEVICE FOR A MOTOR VEHICLE

The present invention relates to passive safety belt devices, and more particularly to an improvement in a guide rail employed in these devices.

There are known in the prior art passive safety belt devices which comprise a strap forming a cross-strap wound at one of its ends by a winder and carrying at its free end a buckle which cooperates with a bolt connected to a sliding element which slides in a guiding and retaining rail connected to the vehicle. An example of such a device is disclosed in the U.S. Pat. No. 4,241,939.

A part of this guiding rail is disposed against the vertical post of the vehicle body and another part is applied against the outer edge of the roof above the opening of the door.

This rail has a bend whose radius of curvature is small in the region of the corner of the door. This creates problems in respect of the sliding of the sliding element when it is moved in the region of the bend.

Indeed, the guiding rail must guide the slidable element while having sufficient rigidity for supporting forces created by the displacement of the strap for a minimum cost price and weight so as to satisfy requirements common in the motor vehicle industry.

An object of the invention is to solve these problems.

The invention therefore provides a guiding rail in which is movable a slidable element connected to a bolt which projects through a slot formed in said rail and cooperates with a passive safety belt buckle, in particular for a motor vehicle, wherein the rail is constituted, at least in the part thereof for guiding the slidable element, by two lateral portions for guiding the displacement of the slidable element disposed on each side of said slot, and a bearing portion for the slidable element disposed in facing relation to said slot.

A better understanding of the invention will be had from the following description which is given solely by way of example and refers to the accompanying drawings, in which:

FIG. 3 is a top plan view of a slidable element comprising a bolt, placed in a guiding rail according to the invention;

FIG. 4 is a sectional view taken on line A—A of FIG. 3 in which there is shown a bolt in the position retracted within the guiding rail according to the invention;

FIG. 5 is a sectional view taken on line B—B of FIG. 4, and,

FIG. 1 shows diagrammatically a vehicle V whose driver seat S is equipped with a passive safety belt device.

Figure 1:
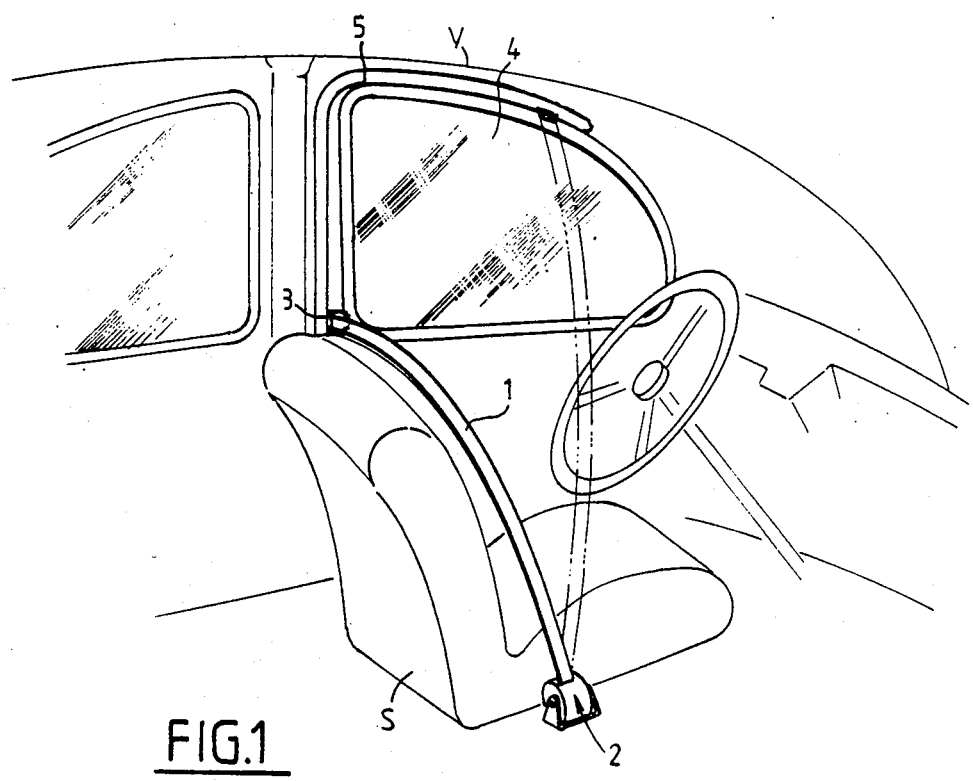
FIG. 1 is a diagrammatic perspective view of the compartment of a motor vehicle equipped with a passive safety belt device.

The safety belt comprises a strap 1 constituting a cross-strap whose end is wound around a winder 2 disposed on the inner side of the seat S. At its end opposed to the winder 2, the strap 1 carries a buckle 3 which cooperates with a bolt connected to a slidable element (not shown) which travels around a door 4 in a hollow guiding and retaining rail 5, a portion of which is disposed against the vertical post of the body of the vehicle V, whereas another portion bears against the outer edge of the roof above the opening of the door 4.

It is known that the guiding rail 5 performs no function of taking the forces produced for example in an accident. The function of this guiding rail 5 is limited to the guiding and retention of the slidable element disposed inside the rail.

However, the guiding rail must be so designed as to ensure the resistance to low forces produced for example when shifting the strap.

Figure 2:
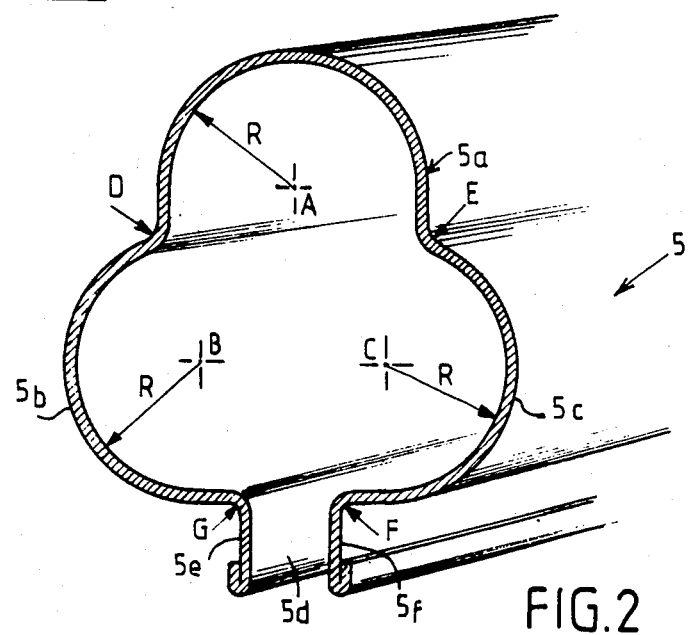
FIG. 2 is a sectional and perspective view of a guiding rail according to the invention.

As can be seen in FIG. 2, the guiding rail 5 is in the form of three roughly semi-cylindrical portions 5a, 5b, 5c having centres A, B and C respectively, and inside radii R.

A longitudinal slot 5d defined by flanges 5e and 5f projecting outwardly is formed in the region of the junction of the semi-cylindrical portions 5b and 5c. This configuration has connecting portions D, E, F and G in the region of the junctions between the semi-cylindrical portions and in the region of the junctions of the semi-cylindrical portions 5b and 5c with the flanges 5e and 5f defining the longitudinal slot 5d.

When viewed in section, the guiding rail is therefore formed by roughly semi-circular lobes.

For reasons of facility of manufacture by a cold-forming operation, this rail is made from steel or ferrous material, for example stainless steel, having a thickness of 0.5 mm.

Calculations of the moment of inertia resulting in the aptitude to be formed, on one hand, and the required rigidity, on the other, while permitting the bending of the guiding rail with a smaller radius, for example in the region of the corner of the door, result in the adoption of this "trefoil" section for the chosen thickness.

Calculations have also enabled values which are particularly advantageous to be determined for the distance between the centres of the three semi-cylindrical portions constituting the "trefoil".

Thus, the distance between the points A and B and the distance the points A and C are advantageously equal to 1.6 times the radius R (1.6×R). The distance between the points B and C, i.e. those which are the closest to the slot 5d provided between the two semi-cylindrical portions 5b and 5c, is advantageously equal to 1.5 times the radius (1.5×R).

The rectilinear connecting portions in the region of the junctions between the semi-cylindrical portions 5a, 5b, 5c and with the longitudinal slot 5d, i.e. at D, E, F and G, have a length which is at least equal to the radius R divided by four (R/4).

This guiding rail must therefore perform the function of guiding a slidable element, have sufficient rigidity for supporting the forces produced by the displacement of the strap, and a minimum weight so as to satisfy requirements common in the motor vehicle industry.

The guiding rail is fixed to the body of the vehicle by any suitable means, for example by brackets which are mounted on and welded to the body of the vehicle.

As will be seen hereinafter, the guiding of the slidable element is ensured by the semi-cylindrical portions 5b and 5c, while the semi-cylindrical portion 5a provides a support or bearing surface for the slidable element proper which has a corresponding shape.

As shown in FIG. 3, a slidable element 6 id disposed inside the guiding rail 5. This slidable element 6 has an outer surface corresponding to a "trefoil" configuration.

As will be seen hereinafter, the slidable element 6 has two semi-spherical portions 6b and 6c disposed on each side of a centered cavity 6d in which is disposed a bolt 7 which projects out of the guiding rail 5 through the slot 5d. The slidable element 6 also has a rear surface 6a whose shape will be defined hereinafter and which cooperates with the semi-cylindrical portion 5a of the guiding rail 5.

As can be seen, this slidable element has an outer surface which cooperates with the corresponding inner surface of the guiding rail. Thus, the semi-spherical portions 6b and 6c of the slidable element are fitted in the semi-cylindrical portions 5b and 5c of the guiding rail.

Operational clearance exists between the corresponding portions so that the sliding of the slidable element in the guiding rail is facilitated.

With reference now to FIG. 4 which is a sectional view taken on line A—A of FIG. 3 and in which the bolt 7 is shown in a position retracted within the guiding rail 5, it can be observed that the bolt 7 is mounted to be rotatable about a pin 8 connected to the slidable element 6. The bolt 7 can therefore pivot on the slidable element 6 between an operative position in which it projects out of the guiding rail and a retracted within the guiding rail. The bolt 7 is in the form of a plate having at one end a cavity 7a which cooperates with a corresponding part of a safety belt buckle (not shown) and at the other end an opening 7b in which the pin 8 is disposed.

The end of this bolt 7 which is disposed in the central cavity 6d of the slidable element 6 is rounded.

This slidable element may be connected to any suitable actuating means. Thus, for example, the slidable element is of a plastics material and is rigidly connected to the end of a driving belt 9 which is connected to an actuating device (not shown) so as to shift the slidable element 6 in the guiding rail 5.

This connection is provided by any known means but may advantageously be achieved by moulding the slidable element 6 onto the belt 9. The materials of these two elements must therefore be compatible so that the moulding of the element onto the belt results in a lasting and effective connection.

As can be seen more clearly in FIG. 5, the slidable element 6 has two arms 11 and 12 which are for example in one integral piece and extend beyond the pin 8 from the main body of the slidable element 6. At the upper end of these two branches 11 and 12, there are formed bosses 11a and 12a which may advantageously have a semi-spherical shape and cooperate with cavities of corresponding shape 7c and 7d provided on each side of the bolt 7.

The semi-spherical portions 6b and 6c of the slidable element 6 which guide this slidable element in the rail 5 are shown in this FIG. 5.

The pin 8 is disposed in the slidable element in the region of the two semi-spherical portions 6b and 6c and has at each of its ends cavities 8a and 8b which may be advantageously conical. The inner surface of the slidable element 6 has, in the region of the aforementioned semi-spherical portions, bosses 13 and 14 which may advantageously be of conical shape and cooperate with said cavities 8a, 8b so as to maintain the pin 8 in position and thus enable the bolt 7 to pivot on the slidable element 6.

As in clear from the foregoing description, the bolt 7, which is shown in dot-dash lines in the active position in FIG. 4, i.e. projecting from the rail 5, may be brought in the direction indicated by arrow E to a retracted position shown in full lines in this FIG. 4, in which the bolt is disposed between the arms 11 and 12 of the slidable element 6 and therefore within the guiding rail 5. The bosses 11a and 12a then cooperate with the cavities 7c and 7d of the bolt 7 in such manner as to lock this bolt in its retracted position.

As the bolt 7 is retracted within the rail 5, it can therefore no longer hinder access to the vehicle.

Note that the rear surface of the slidable element, i.e. the portion 6a of the latter coming into contact with the semi-cylindrical portion 5a of the guiding rail, has a special shape.

Indeed, this surface has:

a first centre A, as already mentioned, so that in cross-section of the guiding rail, the radius of this portion is such that there exists an operating clearance on the order of 0.2 mm between the portion 6a of the slidable element and the portion 5a of the guiding rail;

a second centre H (FIG. 6) and a radius less than T so that if T is the minimum radius of curvature of the guiding rail corresponding for example to the bend of the guiding rail above the door, the sliding of the slidable element in the rail is always possible.

Upon assembly, the pin 8 is inserted in the opening 7b of the bolt 7 and this assembly is then forced into the corresponding cavity of the slidable element 6 in the direction indicated by arrow F in FIG. 4.

Figure 6:
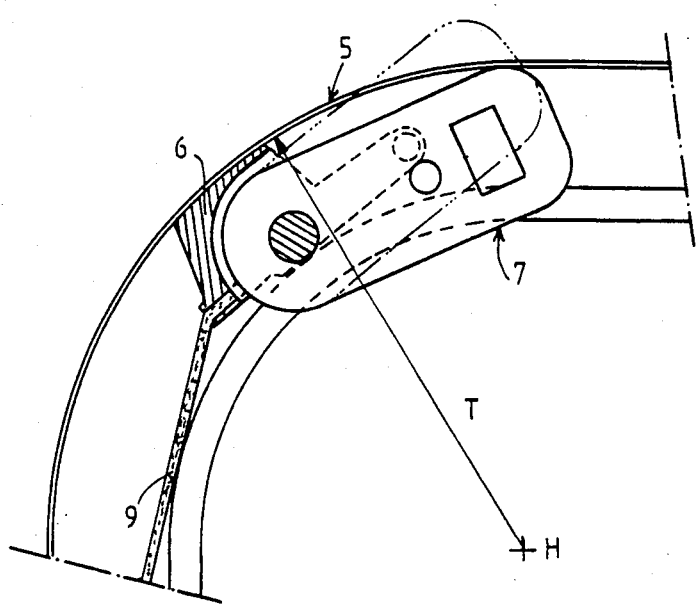
FIG. 6 is a sectional view of a slidable element placed in a particular position of the guiding rail according to the invention.

When it is desired to unlock the bolt 7 from its retracted position, the slidable element is shifted to a curved portion of the guiding rail whose radius of curvature is sufficient to allow the bottom wall of the rail to push the free end of the bolt 7 opposed to its pivotable mounting on the slidable element so that the cavities 7c, 7d of this bolt are disengaged from the bosses 11a, 12a of the slidable element. This consequently causes an angular displacement of the bolt. A part of the bolt then slightly emerges from the guiding rail and it is possible to take hold of it so as to fully release the bolt, as can be seen in FIG. 6.

The length of the bolt is therefore such that it permits sufficient angular displacement of the bolt for taking hold of it.

The assembly constructed in this way must be sufficient to ensure resistance to the forces produced by the displacements of the strap but does not participate in the safety function itself, as already mentioned.

Indeed, if an abnormal force is exerted by a user on the strap, the position of the pin 8 relative to the connecting portions F and G of the guiding rail 5 is such that a generatrix of the pin 8 comes to bear thereagainst upon a very slight deformation of the assembly.

The elasticity of the slidable element and the cooperation of the bosses 13 and 14 of this element with the cavities 8a and 8b of the pin 8, creates a component which returns the pin 8 to its correct position as soon as the abnormal force ceases.

It will be understood that an automatic device for returning the bolt 7 to its retracted position within the guiding rail may be provided without departing from the scope of the invention defined in the appended claims.

Thus, for example, a return coil spring (not shown) may be provided on the pin 8 so that, when the buckle 3 is disconnected from the bolt 7, the bolt 7 automatically withdraws into the guiding rail to its retracted position.

What is claimed is:

1. A guiding rail having a slot and in combination with a slidable element which is slidable in the rail and connected to a bolt which projects through the slot for cooperation with a passive safety belt buckle, in particular for a motor vehicle, said rail comprising, at least in a part thereof guiding the slidable element, two lateral portions for guiding the displacement of the slidable element and disposed on each side of said slot, and a bearing portion for the slidable element disposed in facing relation to said slot, and wherein said lateral guiding portions are constituted, in section, by substantially semi-circular lobes disposed on each side of said slot and said bearing portion is constituted, in section, by a substantially semi-circular lobe disposed in facing relation to said slot.

2. A guiding rail according to claim 1, wherein a distance between the centres of the lobes defining the lateral portions is equal to 1.5 times the radius R.

3. A guiding rail having a slot and in combination with a slidable element which is slidable in the rail and connected to a bolt which projects through the slot for cooperation with a passive safety belt buckle, in particular for a motor vehicle, said rail comprising, at least in a part thereof guiding the slidable element, two lateral portions for guiding the displacement of the slidable element and disposed on each side of said slot, and a bearing portion for the slidable element disposed in facing relation to said slot, wherein said lateral guiding portions are constituted, in section, by substantially semi-circular lobes disposed on each side of said slot, and wherein said bearing portion is constituted, in section, by a substantially semi-circular lobe disposed in facing relation to said slot, and wherein the lobes have a radius equal to R, and distances between the centre of the lobe defining the bearing portion, and the centres of the lobes defining the lateral portions are equal to 1.6 times the radius R.

4. A guiding rail according to claim 3, wherein a distance between the centres of the lobes defining the lateral portions is equal to 1.5 times the radius R.

5. A guiding rail according to claim 7, wherein the connecting portions defined at junctions between the lobes and at junctions of the lobes with the slot have a length equal to the radius R divided by four.

6. A passive safety belt device, in particular for a motor vehicle, comprising a guiding rail having a slot and in combination with a slidable element which is slidable in the rail and connected to a bolt which projects through the slot for cooperation with a passive safety belt buckle, said rail comprising, at least in a part thereof guiding the slidable element, two lateral portions for guiding the displacement of the slidable element and disposed on each side of said slot, and a bearing portion for the slidable element disposed in facing relation to said slot, and wherein said lateral guiding portions are constituted, in section, by substantially semi-circular lobes disposed on each side of said slot and said bearing portion is constituted, in section, by a substantially semi-circular lobe disposed in facing relation to said slot.

* * * * *